US009099252B2

(12) United States Patent
Liu et al.

(10) Patent No.: US 9,099,252 B2
(45) Date of Patent: Aug. 4, 2015

(54) APPARATUS AND ASSOCIATED METHODS

(75) Inventors: Yinglin Liu, Cambridge (GB); Pritesh Hiralal, Las Palmas (ES); Markku Rouvala, Helsinki (FI); Piers Andrew, Cambridge (GB); Tapani Ryhanen, Helsinki (FI)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 13/475,190

(22) Filed: May 18, 2012

(65) Prior Publication Data

US 2013/0309527 A1    Nov. 21, 2013

(51) Int. Cl.

| H01M 2/00 | (2006.01) |
|---|---|
| H01G 11/26 | (2013.01) |
| B44C 1/22 | (2006.01) |
| H01G 9/035 | (2006.01) |
| H01G 9/042 | (2006.01) |
| H01G 9/048 | (2006.01) |
| H01M 4/64 | (2006.01) |
| H01M 10/02 | (2006.01) |

(Continued)

(52) U.S. Cl.
CPC *H01G 11/26* (2013.01); *B44C 1/22* (2013.01); *H01G 9/035* (2013.01); *H01G 9/042* (2013.01); *H01G 9/048* (2013.01); *H01G 11/30* (2013.01); *H01M 2/00* (2013.01); *H01M 4/64* (2013.01); *H01M 10/02* (2013.01); *B82Y 30/00* (2013.01); *Y02E 60/13* (2013.01); *Y10T 156/10* (2015.01)

(58) Field of Classification Search
USPC ........................................... 429/218.1, 231.8
See application file for complete search history.

(56) References Cited

U.S. PATENT DOCUMENTS

| 4,830,938 | A | * | 5/1989 | McCullough et al. | ........ 429/149 |
| 5,821,012 | A | * | 10/1998 | McCullough | ................. 429/209 |
| 6,201,685 | B1 | | 3/2001 | Jerabek et al. | ................. 361/502 |

(Continued)

FOREIGN PATENT DOCUMENTS

| WO | WO 2005/089390 A2 | 9/2005 |
| WO | WO 2011/157885 A1 | 12/2011 |

(Continued)

OTHER PUBLICATIONS

Whitehead, Adam H, and Martha Schreiber. "Current Collectors for Positive Electrodes of Lithium-Based Batteries." Journal of the Electrochemical Society 152.11 (2005) : A2105. (9 pages).

(Continued)

*Primary Examiner* — Ula C Ruddock
*Assistant Examiner* — Scott J Chmielecki
(74) *Attorney, Agent, or Firm* — Harrington & Smith

(57) ABSTRACT

An electrode, the electrode including a conducting layer configured to act, in use, as a charge collector to provide an electrical path for generated and/or stored charge through the conducting layer; a barrier layer, the barrier layer configured to cover a portion of a surface of said conducting layer such that, when the electrode is in contact with an electrolyte, the electrolyte is prevented from substantially contacting and corroding the conducting layer at the covered portion; and an active electrode element configured for use in generation and/or storing charge, the active electrode element positioned in a non-covered portion in electrical contact with the conducting layer to prevent the electrolyte from substantially contacting and corroding the conducting layer in the non-covered portion and to also be exposed to said electrolyte to allow for the generation and/or storage of charge and provide the generated/stored charge to the conducting layer.

16 Claims, 7 Drawing Sheets

(51) Int. Cl.
*H01G 11/30* (2013.01)
*B82Y 30/00* (2011.01)

(56) References Cited

U.S. PATENT DOCUMENTS

| | | |
|---|---|---|
| 7,558,050 B2 | 7/2009 | Roh et al. ............... 361/502 |
| 2004/0048157 A1* | 3/2004 | Neudecker et al. ....... 429/231.2 |
| 2007/0015061 A1* | 1/2007 | Klaassen ................. 429/322 |
| 2008/0003493 A1* | 1/2008 | Bates ..................... 429/66 |
| 2009/0186169 A1* | 7/2009 | Shacklette et al. ........ 428/1.6 |
| 2010/0040950 A1* | 2/2010 | Buiel et al. .............. 429/211 |
| 2010/0227209 A1* | 9/2010 | Kim ....................... 429/94 |
| 2010/0330425 A1* | 12/2010 | Lopatin et al. ............ 429/220 |
| 2011/0070493 A1 | 3/2011 | Gadkaree et al. |
| 2011/0076561 A1* | 3/2011 | Kuriki et al. .............. 429/218.1 |
| 2011/0281162 A1* | 11/2011 | Buiel et al. ............... 429/211 |
| 2012/0025787 A1 | 2/2012 | Rouvala et al. |
| 2012/0034521 A1* | 2/2012 | Matsuyama et al. ........ 429/211 |
| 2012/0120555 A1 | 5/2012 | Kagata et al. |

FOREIGN PATENT DOCUMENTS

| | | |
|---|---|---|
| WO | WO 2012/013855 A1 | 2/2012 |
| WO | WO 2012/013998 A1 | 2/2012 |
| WO | WO 2012/042286 A1 | 4/2012 |

OTHER PUBLICATIONS

J. Zhang; S. Xie,; X. Wei; Y.J. Xiang; C.H. Chen; "Lithium insertion in naturally surface-oxidized copper," Journal of Power Sources; vol. 137, Issue 1, Oct. 5, 2004, pp. 88-92.

* cited by examiner

APPARATUS AND ASSOCIATED METHODS

TECHNICAL FIELD

The present disclosure relates to the field of electronics, associated apparatus and methods, and in particular concerns the electrodes of batteries and supercapacitors. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

The increasing capability and functionality of portable electronic devices places increasing demands on energy storage media and drives technological advancement in battery and capacitor technology. Next generation portable devices may require solid-state batteries and capacitors with high power density and flexibility to meet the various power and design needs. Furthermore, in order to satisfy industry volume demands, the energy storage media must be capable of mass production at a reasonable cost.

Supercapacitors bridge the gap between batteries and conventional electrolytic capacitors and open a new set of possibilities for power demanding applications. Supercapacitors offer new opportunities for mobile devices, with potential uses and improvements for instance in camera flash, audio and RF performance as well as helping to extend battery life by supplying current peaks. One fundamental parameter of supercapacitors is the internal resistance. The power density of a supercapacitor, $P_{max}$, can be given as $P_{max}=U^2/(4\times ESR\times M)$, where U is the nominal cell voltage (V), ESR is equivalent series resistance and M is total mass of the electrodes. Therefore, keeping the ESR value as low as possible may be beneficial for high current applications.

The apparatus and associated methods disclosed herein may or may not address one or more of these issues.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an electrode, the electrode comprising:
a conducting layer configured to act, in use, as a charge collector to provide an electrical path for generated and/or stored charge through the conducting layer;
a barrier layer, the barrier layer configured to cover a portion of a surface of said conducting layer such that, when the electrode is in contact with an electrolyte, the electrolyte is prevented from substantially contacting and corroding the conducting layer at the covered portion; and
an active electrode element configured for use in generation and/or storing charge, the active electrode element positioned in a non-covered portion in electrical contact with the conducting layer to prevent the electrolyte from substantially contacting and corroding the conducting layer in the non-covered portion and to also be exposed to said electrolyte to allow for the generation and/or storage of charge and provide the generated/stored charge to the conducting layer.

The barrier layer may be an electrical insulator.

The active material may comprise one or more of the following: activated carbon, carbon nanoparticles, carbon nanotubes, carbon nanohorns, a carbon nanotube network, graphene, graphene platelets, metal nanowires, a metal nanowire mesh, semiconductor nanowires, a semiconductor nanowire mesh, and metal oxide nanoparticles.

A portion of the conducting layer not covered by the barrier layer may be configured to act as an electrical contact for connection to electrical components of a circuit.

The conducting layer may comprise copper.

The barrier layer may comprise one or more of plastic, polymer, polyimide, polyester, polyurethane and polyethylene.

The barrier layer may be bonded to the conducting layer using adhesive. The adhesive may comprise an epoxy adhesive or an acrylic-based adhesive. The barrier layer may be configured to adhere directly onto the conducting layer.

One or more of the conducting layer and the barrier layer may be formed from respective layers of a circuit board. The circuit board may be a rigid board, a rigid-flex board, or a flexible board.

An apparatus may comprise:
first and second electrodes, at least one electrode being an electrode according to the first aspect, wherein the apparatus is configured such that a chamber is defined between the first and second electrodes, the chamber comprising the electrolyte.

The apparatus may be one or more of an electrical storage apparatus, circuitry for an electrical storage apparatus, and a module for an electrical storage apparatus (e.g. battery or capacitor). The apparatus may form part of portable electronic device or part of a module for a portable electronic device. The portable electronic device may be a portable telecommunications device.

The electrical storage apparatus may comprise first and second electrodes and an electrolyte. At least the first electrode may be any electrode described herein. The electrolyte may be configured to allow the transfer of mobile ions (or charge) to and/or from the first and/or second electrodes to enable the generation and/or storage of electrical energy.

The electrical storage apparatus may be a battery or a capacitor (e.g. a supercapacitor). The electrical storage apparatus may be a lithium-metal battery, a lithium-ion battery, a lithium-ion capacitor or other charge carrier based electrochemical capacitor (supercapacitor, or ultracapacitor), such as a chloride (Cl) ion transport based electrochemical supercapacitor. The electrical storage apparatus may form part of a portable electronic device or part of a module for an electronic device. The portable electronic device may be a portable telecommunications device.

The first and second electrodes may be sealed together to contain the electrolyte within the chamber.

One or more electrical components may be physically and electrically connected to one or both of the first and second electrodes to allow for the supply of electrical energy to said one or more electrical components.

The electrolyte may comprise one or more of propylene carbonate, tetraethylammonium tetrafluoroborate, an aqueous solution of potassium chloride.

The apparatus may comprise a separator between the first and second electrodes.

The apparatus may be at least one of the following: a battery, a capacitor, a supercapacitor, an ultracapacitor, an electrochemical ion transport based capacitor and a battery-capacitor hybrid.

According to a further aspect, there is provided a method of making an electrode, the method comprising:
  providing a conducting layer configured to act, in use, as a charge collector to provide an electrical path for generated and/or stored charge through the conducting layer;
  providing a barrier layer, the barrier layer configured to cover a portion of a surface of said conducting layer such that, when the electrode is in contact with an electrolyte, the electrolyte is prevented from substantially contacting and corroding the conducting layer at the covered portion; and
  providing an active electrode element configured for use in generation and/or storing charge, the active electrode element positioned in a non-covered portion in electrical contact with the conducting layer to prevent the electrolyte from substantially contacting and corroding the conducting layer in the non-covered portion and to also be exposed to said electrolyte to allow for the generation and/or storage of charge and provide the generated/stored charge to the conducting layer.

The barrier layer may be provided using a flexible printed circuit lamination technique.

The method may comprise:
  etching away part of a barrier layer from the surface of the conducting layer to provide the non-covered portion; and
  providing the active electrode element on to the non-covered portion.

The barrier layer may be provided by etching a cover layer away. The cover layer (e.g. comprising an electrically insulating layer such as polyimide or other plastic) is first laminated, using a standard flexible printed circuit (FPC) process, on top of a base copper layer. An etching process is then used to remove one or more portions of the cover layer. For example, portions of the cover layer may be removed in areas meant for ion transport (electrolyte) access (in an area of the current collector to be covered later by active carbon (AC) or other porous materials to form the active surface area) and/or for electrical contacts.

The barrier layer may be provided using lithography. A portion of the barrier layer may be removed using an etch to create the uncovered portion.

The barrier layer may or may not be more chemically resistant to the electrolyte than the conducting layer.

The electrolyte may be a solid or gel electrolyte. The solid or gel electrolyte may comprise lithium phosphorous oxynitride. The electrolyte may be a polymer electrolyte. The polymer may comprise one or more of the following: derivates of poly(ethylene oxide), and borate ester groups.

The steps of any method disclosed herein do not have to be performed in the exact order disclosed, unless explicitly stated.

According to a further aspect, there is provided a computer program for controlling the making of an electrode, the computer program comprising computer code configured to control one or more of:
  providing a conducting layer configured to act, in use, as a charge collector to provide an electrical path for generated and/or stored charge through the conducting layer;
  providing a barrier layer, the barrier layer configured to cover a portion of a surface of said conducting layer such that, when the electrode is in contact with an electrolyte, the electrolyte is prevented from substantially contacting and corroding the conducting layer at the covered portion; and
  providing an active electrode element configured for use in generation and/or storing charge, the active electrode element positioned in a non-covered portion in electrical contact with the conducting layer to prevent the electrolyte from substantially contacting and corroding the conducting layer in the non-covered portion and to also be exposed to said electrolyte to allow for the generation and/or storage of charge and provide the generated/stored charge to the conducting layer.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 3d illustrates a flexible printed circuit boards comprising an embodiment similar to that of FIG. 3a;

DESCRIPTION OF SPECIFIC ASPECTS/EMBODIMENTS

In electrical circuits, batteries and capacitors are used to provide other components with electrical power. These power supplies operate in quite different ways, however.

Figure 1A:
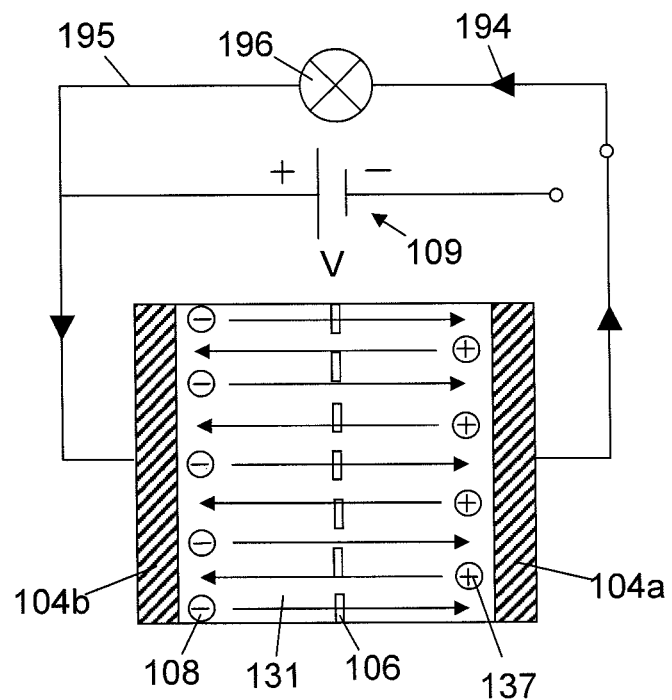
FIG. 1a illustrates the discharge process of a conventional battery.

Batteries use electrochemical reactions to generate electricity. The discharge process of a conventional battery is shown in FIG. 1a. Batteries comprise two electrical terminals (electrodes 104a, 104b) separated by an electrolyte 131. A battery may also contain a separator 106 to prevent direct physical contact between the electrodes, which is particularly important when liquid electrolytes are used. At the negative electrode (the anode 104a), an oxidation reaction takes place which produces electrons. These electrons flow round an external circuit 195 (indicated by the arrows 104) from the anode 104a to the positive electrode (the cathode 104b) allowing a reduction reaction to take place at the cathode 104b. The flow of electrons can be used to power one or more electrical components 196 in the external circuit 195. The oxidation and reduction reactions may continue until the reactants are completely converted. Importantly though, unless electrons are able to flow from the anode 104a to the cathode 104b via the external circuit 195, the electrochemical reactions cannot take place. This allows batteries to store electricity for long periods of time. As the electrons flow round the external circuit from the anode 104a to the cathode 104b, a negative charge cloud develops in the electrolyte 131 around the cathode 104b, and a positive charge cloud develops in the electrolyte 131 around the anode 104a. Positive 137 and negative 138 ions in the electrolyte 131 move to neutralise these charge clouds, allowing the reactions, and the flow of electrons, to continue. Without the ions 137, 138 from the electrolyte 131, the charge clouds around each electrode 104a, 104b would inhibit the generation of electricity.

Figure 1B:
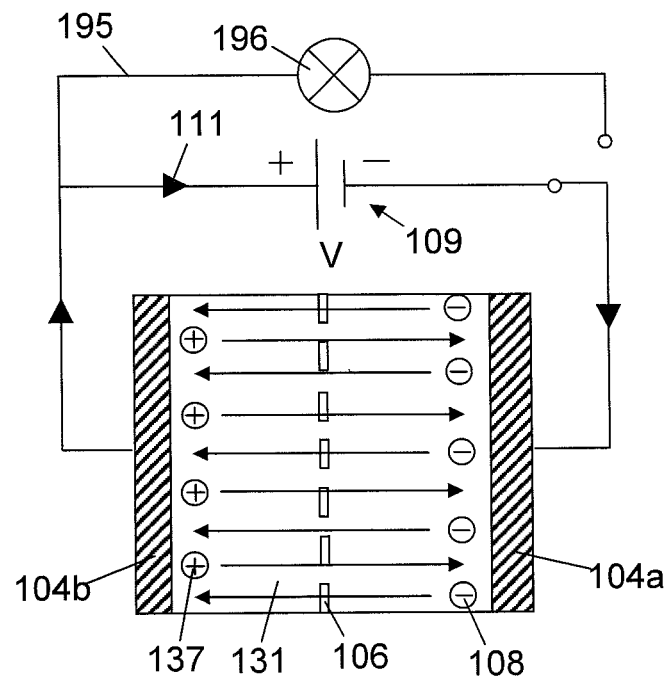
FIG. 1b illustrates the charging process of a conventional battery.

A primary cell is any kind of battery in which the electrochemical reaction is not reversible. These are used as disposable batteries. With secondary batteries, on the other hand, the electrochemical reaction is reversible, meaning that the chemical reactants can be restored to their original state. These are used as rechargeable batteries. The charging process of a conventional rechargeable battery is shown in FIG. 1b. To charge the battery, a potential difference is applied between the anode 104a and cathode 104b. The positive terminal of the charger 109 strips electrons from the cathode 104b and returns them to the anode 104a (indicated by the arrows 111), inducing chemical reactions at the electrode-electrolyte interface. Again, to compensate for the transfer of charge, positive 107 and negative 108 ions in the electrolyte 131 move between the electrodes 104a, 104b in opposite directions to before.

The current and voltage generated by a battery is dependent on the materials used for the electrodes and electrolyte. The ability of a material to lose or gain electrons with respect to another material is known as its electrode potential. The strengths of oxidising and reducing agents are indicated by their standard electrode potentials. Materials with a relativity positive electrode potential are used to form the anode, whilst those with a relativity negative electrode potential are used to form the cathode. The greater the difference between the anode and cathode potentials, the greater the amount of electrical energy that can be produced by the cell. For example, lithium appears at the top of the electrochemical series (large negative electrode potential), indicating that it is a strong reducing agent. Likewise, fluorine appears at the bottom of the electrochemical series (large positive electrode potential), indicating that it is a strong oxidising agent.

As a result of lithium's high electrode potential, lithium batteries are capable of producing voltages of nearly 4V, over twice the voltage of a zinc-carbon or alkaline battery. Depending on the choice of materials for the anode, cathode and electrolyte, the current, voltage, capacity, life and safety of a lithium battery can change dramatically. Recently, novel architectures have been employed to improve the performance of these batteries. Pure lithium is very reactive and will rigorously react with water to form lithium hydroxide and hydrogen gas. For this reason, non-aqueous electrolytes are used, and water is rigidly excluded from the battery pack using a sealed container.

That said, many different lithium batteries exist because of lithium's low reactivity with a number of cathodes and non-aqueous electrolytes. The term "lithium battery" refers to a family of different chemistries comprising lithium metal or lithium compounds as the anode with a host of different materials for the cathodes and electrolytes. A porous carbon material often serves as a cathode charge collector to receive electrons from the external circuit.

In a typical lithium-ion battery, the anode is made from carbon, the cathode is a metal oxide, and the electrolyte is a lithium salt in an organic solvent. Commercially, the most popular anode material is graphite, and the cathode generally comprises: a layered oxide (such as lithium cobalt oxide), one based on a polyanion (such as lithium iron phosphate), or a spinel (such as lithium manganese oxide). The electrolyte is typically a mixture of organic carbonates such as ethylene carbonate or diethyl carbonate containing complexes of lithium ions. These non-aqueous electrolytes often comprise non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

In contrast to batteries, capacitors store charge electrostatically, and are not capable of generating electricity. A relatively new type of capacitor known as a "supercapacitor" (also known as an electric double layer capacitor, an ultracapacitor, a pseudocapacitor, and an electrochemical double layer capacitor) offers greater energy storage than a conventional or electrolytic capacitor, and is becoming increasingly popular for portable electronic applications.

Figure 2A:
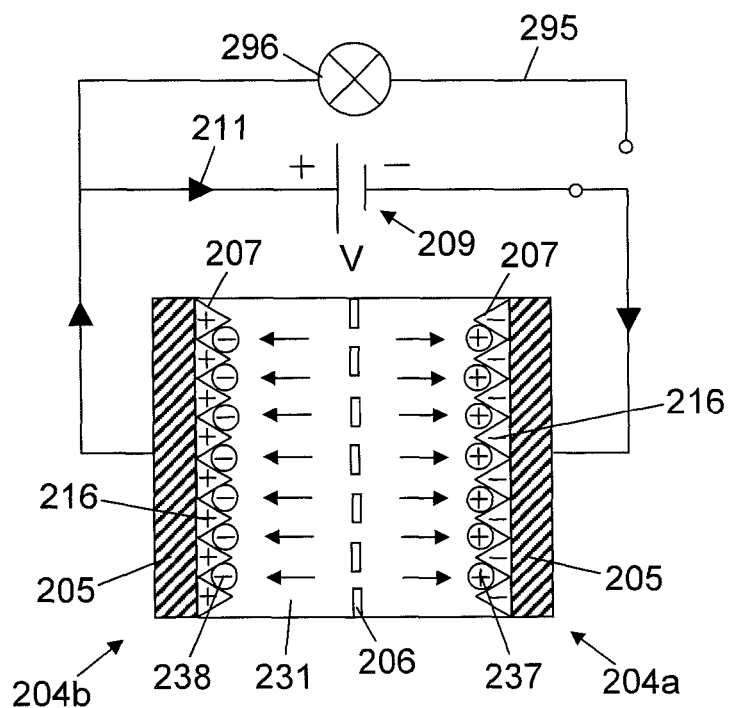
FIG. 2a illustrates the charging process of a supercapacitor.
Figure 2B:
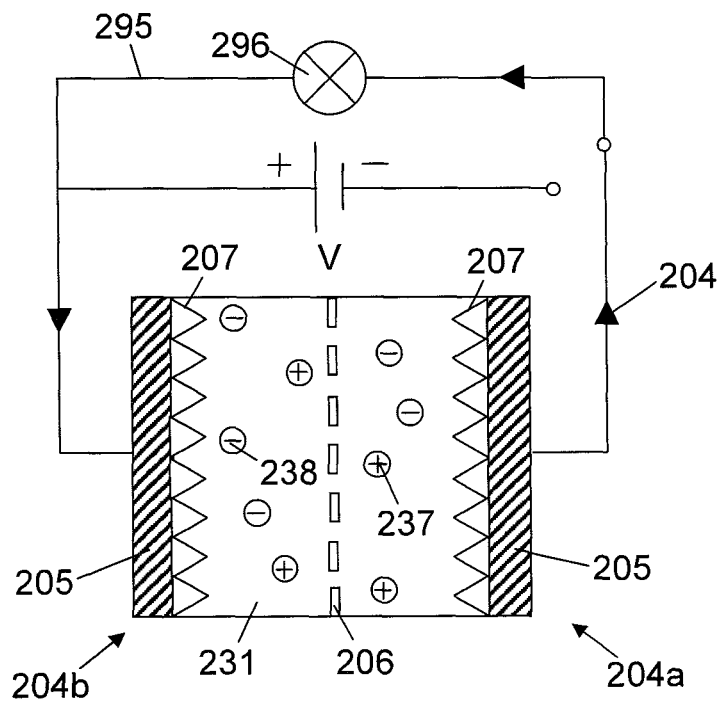
FIG. 2b illustrates the discharge process of a supercapacitor.

FIGS. 2a and 2b illustrate schematically the charging and discharge processes of a supercapacitor, respectively. Supercapacitors have a cathode electrode 204b and an anode electrode 204a, each comprising an electrically conducting plate 205 (charge collector), which are separated by an electrolyte 231. When a liquid electrolyte is used, the supercapacitor may also comprise a separator 206 to prevent direct physical contact between the cathode and anode. The plates 205 are coated in a porous material 207 (such as powdered carbon) to increase their surface area for greater charge storage. When a power supply (charger) applies a potential difference between the electrodes 204a, 204b, the electrolyte 231 becomes polarised. The potential on the cathode 204b attracts negative ions 238 in the electrolyte 231, and the potential on the anode 204a attracts positive ions 237. This is shown in FIG. 2a.

Unlike batteries, the applied potential is kept below the breakdown voltage of the electrolyte 231 to prevent electrochemical reactions from taking place at the surface of the electrodes 204a, 204b. For this reason, supercapacitors cannot generate electricity like electrochemical cells. As a result, no significant current can flow between the electrolyte 231 and the electrodes 204a, 204b. Instead, the ions 237, 238 in solution arrange themselves at the surfaces of the electrodes 204a, 204b to mirror the surface charge 216 and form an insulating "electric double layer". In an electric double layer (i.e. a layer of surface charge 216 and a layer of ions 237, 238) the separation of the surface charge 216 and ions 237, 238 is generally on the order of nanometers. The combination of the electric double layer and the use of a high surface area material 207 on the surface of the plates 205 allow a huge number of charge carriers to be stored at the electrode-electrolyte interface.

To discharge the supercapacitor (as shown in FIG. 2b), an electrical connection 295 is made between the charged electrodes 204a, 204b, causing electrons to flow from the anode to the cathode via the external circuit (as indicated by the arrows 294). This flow of charge can be used to power one or more electrical components 296 in the external circuit 295.

Activated carbon may not be the most suitable material 207 for coating the plates 205 of the capacitor, however. The ions 237, 238 in solution are relatively large in comparison to the pores in the carbon, and this limits the energy storage considerably. Recent research in this area has focused on the use of carbon nanotubes and carbon nanohorns instead, both of which offer higher useable surface areas than activated carbon.

Supercapacitors have several advantages over batteries, and as a result, have been tipped to replace batteries in many applications. They function by supplying large bursts of current to power a device and then quickly recharging themselves. Their low internal resistance, or equivalent series resistance (ESR), permits them to deliver and absorb these large currents, whereas the higher internal resistance of a traditional chemical battery may cause the battery voltage to collapse. Also, whilst a battery generally demands a long recharging period, supercapacitors can recharge very quickly, usually within a matter of minutes. They also retain their ability to hold a charge much longer than batteries, even after multiple chargings. When combined with a battery, a supercapacitor can remove the instantaneous energy demands that would normally be placed on the battery, thereby lengthening the battery lifetime.

Whereas batteries often require maintenance and can only function well within a small temperature range, supercapacitors are maintenance-free and perform well over a broad temperature range. Supercapacitors also have longer lives than batteries, and are built to last until at least the lifetime of the electronic devices they are used to power. Batteries, on the other hand, typically need to be replaced several times during the lifetime of a device.

Supercapacitors are not without their drawbacks, however. Despite being able to store a greater amount of energy than conventional and electrolytic capacitors, the energy stored by a supercapacitor per unit weight is considerably lower than that of an electrochemical battery. In addition, the working voltage of a supercapacitor is limited by the electrolyte breakdown voltage, which is not as issue with batteries.

Some batteries, such as lithium-ion batteries, have a high energy density, whilst supercapacitors generally have a high power density and lifetime. In addition, a hybrid storage device called a lithium-ion capacitor has been developed which aims to integrate the advantages of lithium-ion batteries and supercapacitors. The cathode of a lithium-ion capacitor employs activated carbon at which charges are stored as an electric double layer at the interface between the carbon and the electrolyte, similar to a supercapacitor. The anode, on the other hand, is made of a nanostructured intercalation material pre-doped with lithium ions, similar to a lithium-ion battery. This pre-doping process lowers the anode potential and results in a high cell output voltage. Typically, output voltages for lithium-ion capacitors are in the range of 3.8V to 4V. As a consequence, lithium-ion capacitors have a high energy density. Furthermore, the capacity of the anode is several orders of magnitude greater than the capacity of the cathode. As a result, the change in anode potential during charging and discharging may be much smaller than the change in cathode potential. The intercalation anode can also be coupled with an intercalation cathode, such as $LiCoO_2$ or $LiMn_2O_4$, to increase the power of the lithium-ion capacitor. The electrolyte used in a lithium-ion capacitor is typically a lithium-ion salt solution, and a separator may be used to prevent direct physical contact between the anode and cathode.

With each of the above described systems, the active electrode element in contact with the electrolyte allows charge to be generated and/or stored. To allow this charge to be used elsewhere a charge collector is generally used to transport enable that stored/generated charge to be used elsewhere, for example, in an electrical circuit.

Choosing the right charge collector may have a significant influence on the performance of, for example, the supercapacitor or battery. In choosing a charge collector, several factors need to be considered, for example, including: electrical conductivity, chemical stability to electrolyte, and the contact resistance between the current collector and the active electrode material. For example, current commercially-available supercapacitors with organic electrolytes (0-2.7 V) widely use treated aluminium foils or grids as the current collector as aluminium is relatively chemically inert to the electrolytes used compared with other metals.

However, aluminium may not be the best choice of current collector in terms of electrical conductivity, contact resistance and/or cost. For example, copper may be preferable as a current collector based on conductivity per unit volume, conductivity per unit mass and conductivity per unit cost (see for example J. Electrochem. Soc., Vol. 152, Issue 11, pp. A2105-A2113 (2005)). However, copper is not widely used in supercapacitors especially when using organic electrolytes because the electrochemical stability of copper at high voltage is such that an electrochemical reaction may occur at direct contacts between the electrolyte and the copper. In a typical device construction this occurs at the sides and/or back of the current collector foil.

The problem of oxidising and performance of copper current collectors, for example, in lithium ion batteries may arise from environmental cracking under specific metallurgical conditions at or near the lithium potential. It may be oxidized above 3.4V in the presence of Li/Li+, especially at the presence of small amount of impurities HF and $H_2O$. Also, copper has been found to be able to alloy with lithium. Furthermore, during the storage and transportation under ambient atmosphere, surface oxidation may take place on copper foils or screens, leaving a copper oxide ($Cu_xO$) coating on the exposed parts. CuO electrode has a reversible capacity of about 400 mAh/g in the 3-0.02V range, with a first lithiation capacity of 850 mAh/g for CuO and 600 mAh/g for $Cu_2O$. Such significant irreversible capacity losses imply that, in addition to the formation of well-known solid-electrolyte-interface (SEI) layer on the carbonaceous particles, the first-cycle irreversible capacity loss of a lithium-ion cell may be partially attributed to the lithium insertion process in the surface CuO coating ("*Lithium insertion in naturally surface-oxidized copper*", J. Zhang, Journal of Power Sources 137 (2004) 88-92).

In addition, the problems incurred using copper current collectors apply in a similar manner to other chemistries and to supercapacitors, in addition to Li-ion batteries.

As noted above, to circumvent the problems associated with using copper as a charge collector, supercapacitors with organic electrolytes widely use treated aluminium foils or grids as current collectors. However, the direct electrical contact between the aluminium current collector and electrode material is relatively poor (e.g. compared with copper) and this interfacial resistance results in a high device ESR. Surface treatments such as coating conductive carbon or conductive metal oxide on top of the aluminium are needed to improve the contact between the aluminium and the electrode thereby decreasing the interface resistance of the device. This extra processing step may also increase the cost and complexity of manufacture.

The following described embodiments relate to an electrode (e.g. for a supercapacitor and/or battery) that is configured to prevent the electrolyte from substantially contacting and corroding a portion of a charge collector. This may allow the material of the charge collector to be chosen to optimise, for example, contact resistance and electrical conductivity. For example, mitigating the effects of charge collector chemical reactions with the electrolyte may allow, for example, copper current collectors to be used in supercapacitors with operational voltages over 1V. Copper current collectors may enable lower equivalent series resistances (ESR) and higher capacitance compared to commonly used aluminium current collectors. That is, electrochemical stability may be maintained whilst gaining from the improved conductivity and electrode interface. It will be appreciated that embodiments may be used as electrodes in the above described battery, capacitor and hybrid systems.

Also disclosed is a method to provide thin film protected packaging embedded current collector (which may comprise copper). This may allow low ESR (equivalent series resistance) super capacitors and/or batteries to be produced. In this method, a copper current collector is provided in an electrode with a barrier layer (e.g. polyimide) to protect the current/charge collector from electrolyte interactions. In this method, the barrier layer may cover substantially the entire surface of the charge collector, with the exception of the active electrode element and electrical contacts, to prevent the chemical reaction between the charge collector material and electrolyte. The method may result in a low ESR and high conductive interface to the ion transport phenomena.

Figure 3A:
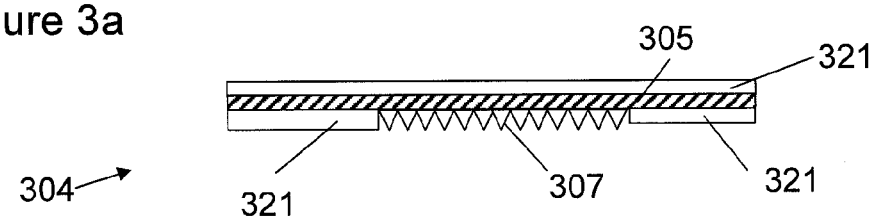
FIG. 3a illustrates an embodiment of an electrode.

FIG. 3a depicts an embodiment comprising an electrode 304, the electrode comprising:
- a conducting layer 305 configured to act, in use, as a charge collector to provide an electrical path for generated and/or stored charge through the conducting layer;
- a barrier layer 321, the barrier layer configured to cover a portion of a surface of said conducting layer such that, when the electrode is in contact with an electrolyte, the electrolyte is prevented from substantially contacting and corroding the conducting layer at the covered portion; and
- an active electrode element 307 configured for use in generation and/or storing charge, the active electrode element 307 positioned in a non-covered portion in electrical contact with the conducting layer 305 to prevent the electrolyte from substantially contacting and corroding the conducting layer in the non-covered portion and to also be exposed to said electrolyte to allow for the generation and/or storage of charge and provide the generated/stored charge to the conducting layer.

In this case the barrier layer 321 comprises polyimide (PI). It will be appreciated that for other example embodiments the barrier layer may comprise other materials, for example, other plastics such as polypropylene, polyester, polyurethane and polyethylene. In this case, the barrier layer is an impermeable, electrically insulating layer.

In this case the conducting layer 305 comprises copper.

The electrode 304 comprises a high surface area active electrode element 307 on top of, and in direct electrical contact with, the electrically conducting layer 305, the material of the active electrode elements 307 comprising a mixture of one or more of activated carbon (AC), multiple wall carbon nanotubes (MWNTs), carbon nanohorns (CNHs), carbon nanofibers (CNFs) and carbon nano-onions (CNOs). AC, MWNTs, CNHs, CNFs and CNOs are used because of their large electrical conductivity and high surface area. As mentioned earlier, the high surface area allows adsorption of large numbers of electrolyte ions onto the surface of the capacitive elements 304.

In this example embodiment, polyimide film is bonded with epoxy adhesive onto the copper foil on the front and rear surfaces which are not coated by active electrode material, leaving the active electrode area free from polyimide. It will be appreciated that the adhesive can be any suitable glue, such as epoxy-based or acrylic-based adhesives. It will be appreciated that in other example embodiments, the barrier layer may adhere directly to the conducting layer. That is, a separate adhesive layer may not be required. Supercapacitors made using the treated copper foil current collectors show good capacitor behaviour in the voltage range −2.5V to +2.5V and may have higher capacitance and lower ESR than those using aluminium or coated aluminium current collectors.

In this example, copper clad laminate (e.g. comprising one or more layers of copper and one or more respective protective layers, such as a polyimide, polyester or poly-ethylene-naphthalate layer, which may be bonded to a respective copper layer using adhesive or may directly bonded to the copper without an adhesive) is the starting point of the process of manufacturing the electrode. The copper clad laminate may be first cut into discrete laminate sections suitably sized and shaped to provide for a printed circuit board (PCB)/electrode configuration. After that it may drilled (to make any required through holes or mico vias (holes that are not through holes, but stop at another copper layer)) and plated with another layer of copper (e.g. using a wet process such as electroplating). The plated layer of copper, in this case, will form the current/charge collector conducting layer of the electrode. A polyimide cover layer (or any other cover coat or solder resist) is provided over the whole surface of the conducting layer (e.g. using an adhesive) and then the outer surface of the cover layer is processed (e.g. by being developed and exposed to form a resist pattern as per known Photo Imagable Cover Layer (PICL) or solder resist processes). If a normal Coverlayer process is used, the areas are cut with a tool away and then placed with an adhesive on top of the copper. Then (in the case of PICL, Covercoat, solder resist but not a normal Coverlayer process) one or more portions of the cover layer polyimide is etched away from the areas where the exposure to the current collector is desired (e.g. using a chemical etch to selectively remove the polyimide layer according to the resist pattern). The rest of the area that is not etched will remain as the barrier layer to protect the copper current collector from the electrolyte. The barrier layer may increase the durability of the current collector and protect the surface from corrosion and increased surface resistivity causing ESR to increase. Then an active electrode element (e.g. comprising activated carbon (AC), carbon nanohorns (CNH) and/or carbon nanotubes (CNT)) is provided on the non-covered portion of the conducting layer to prevent the electrolyte from substantially contacting and corroding the conducting layer in the non-covered portion and to also be exposed to said electrolyte to allow for the generation and/or storage of charge and provide the generated/stored charge to the conducting layer.

It will be appreciated that in other example embodiments, the copper layer of the copper clad laminate may form the current collector and/or the protective layer of the copper clad laminate may form the barrier layer.

The current collector layer may for example be between 12 and 18 µm thick. The barrier layer may be between 12.5 and 25 µm thick. An adhesive layer may be between 10 and 15 µm thick.

In this case, the electrode has a barrier layer on both sides (i.e. it is double sided). It will be appreciated that other example embodiments may only have a barrier layer on a single side (e.g. the side configured to be in contact with the electrolyte).

Figure 3B:
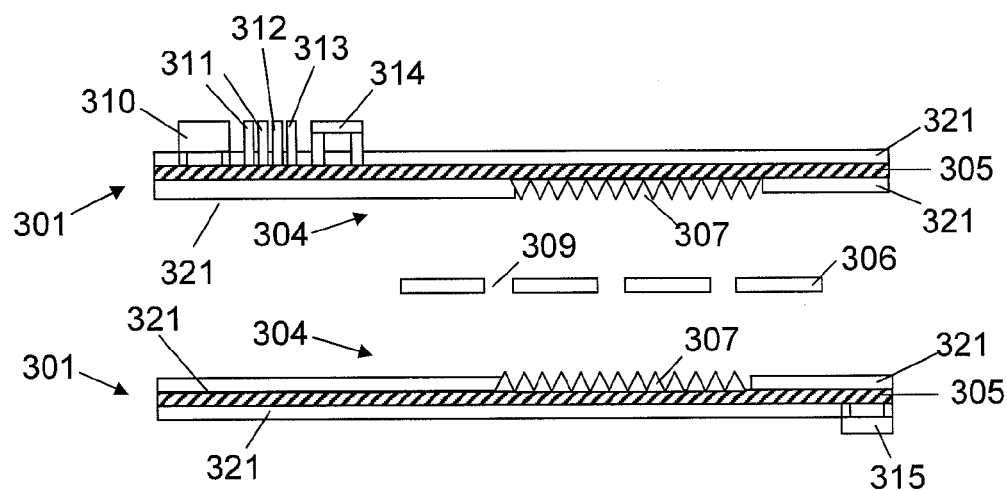
FIG. 3b illustrates two flexible printed circuit boards comprising the embodiment of the electrode and a separator.

FIG. 3b depicts an apparatus comprising two electrodes 304 as shown in FIG. 3a. It will be appreciated that other example embodiments may have only one electrode which is an embodiment of the present disclosure. The apparatus shown in FIG. 3b comprises two FPC (Flexible printed circuit) boards 301, each comprising an electrically conducting layer 305. In this embodiment, the electrically conducting layer 305 on each FPC board 301 is coated on either side by a layer of electrically insulating material 321, which can be used as the barrier layer to prevent the electrolyte from contacting and corroding the conducting layer at the covered portion. In this way, the conducting layer 305 and the barrier layer 321 are formed from respective layers of the circuit board. The insulating barrier layer material 321 is also used to protect the electrically conducting layer 305 from the external environment.

In this case each electrode 304 is produced by processing the current collector using FPC (flexible printed circuit) lamination technology. This enables the surface to be protected (by the barrier layer 321) using the same process as applying the current collectors. The process may be used to apply pre-processed FPC boards with PI/Cu surface that is lithography processed. In addition, using common materials such as copper allows techniques developed for high volume processes to be used such as high accuracy lithography processes. This is in contrast to materials such as aluminium which is not a standard FPC process metal in volumes (although known processes can be adapted, if required). It will be appreciated that the electrode may be produced in other ways.

The high surface area material 307 may be prepared by mixing different proportions of AC, MWNTs and CNHs together using polytetrafluoroethylene (PTFE) or styrene Butadiene Copolymer (SBR) based material as a binder and acetone or water as the solvent, and homogenising the mixture by stirring. Following this, the resulting slurry is applied by rolling the mixture onto the non-covered surface of each electrically conducting layer 305. The FPC boards 301 are then annealed at, for example, 80° C. for 1 hour to drive off the solvent and consolidate the mixture. To maximise its surface area and electrical conductivity, the high surface material 307 is applied to the electrically conducting layers 305 as a thin film.

As shown in FIG. 3b, the FPC boards 301 are configured such that the electrically conducting layers 305 (now coated in the high surface area material 307) are facing one another, sandwiching a thin dielectric separator 306 therebetween. The separator 306 prevents direct physical contact (and therefore electrical contact) between the electrodes 304, but comprises a number of pores 309 to enable the ions of the electrolyte to move towards the high surface area material 307 when a potential difference has been applied between the capacitive elements 304.

In other example embodiments, the electrically conducting layers 305 may be formed from a variety of different materials, but advantageously are made from copper, although aluminium (or other metals) or carbon can also be used. The choice of material affects the physical and electrical properties of the supercapacitor. As noted above, copper, and to a lesser extent aluminium, exhibit favourable electrical conductivity. This is advantageous because it allows charge carriers to flow through the electrically conducting layer 305 to the high surface area material 307 with minimum resistance. The electrically conducting layers 305 may also comprise a surface finish (coating) to protect the electrically conducting layers 305 or to offer better adhesion of the high surface area material 307. Possible surface materials include carbon, nickel-gold, gold and/or silver.

As mentioned previously, supercapacitors may be used to power multimedia enhancement modules in portable electronic devices. For modules that require high power bursts, such as LED flash modules, the supercapacitor needs to be implemented close to the load circuit. In the present case, the FPC structure 301 (within which the supercapacitor is integrated) forms the multimedia enhancement module, with the various components of the module physically (and electrically) connected to the FPC boards 301. In FIG. 3b, a surface mounted (SMD) LED 310, two ceramic caps 311, an indicator LED 312, an inductor 313, and a supercapacitor charger and LED driver circuit 314 are (electrically) connected to the electrically conducting layer 305 of the upper FPC board 301, whilst a board-to-board (B2B) connector 315 is (electrically) connected to the electrically conducting layer 305 of the lower FPC board 301. The various electrical components may be soldered or ACF (anisotropic conductive film) contacted to the FPC boards 301. The electrically conducting layer 305 are used to route power to and from the supercapacitor and module components, and the B2B connector 315 (electrically) connects the FPC structure 301 to the main board of the electronic device.

An electrolyte is required between the electrodes 304 to enable the storage of electrical charge. To achieve this, the FPC boards 301 are configured to form a chamber within which the electrolyte can be contained. The chamber is illustrated in cross-section in FIG. 3c. To create the chamber, a border around the electrodes 304 is defined. The FPC boards 301 are then sealed together at the border to prevent the electrolyte 331 (which may be a gel or liquid-type electrolyte) from leaking out or evaporating during use. The FPC boards 301 may be sealed by heat lamination, vacuum packing or standard FPC punching processes. A small region (not shown) of the border may remain unsealed until the electrolyte 321 has been introduced into the chamber. In certain embodiments, the electrically conducting layer 305 and the barrier layer 321 may extend to the ends of the chamber (not shown).

In another embodiment, a ring may be incorporated into the FPC structure to form a chamber. In this embodiment (not shown), the ring is positioned around the capacitive electrodes 304 and sandwiched between the FPC boards 301. In practice, this may involve placing a first FPC board face-up on a flat surface; placing the ring (which has a diameter of at least the largest in-plane dimension of the capacitive electrodes 304) around the capacitive element of this FPC board; sealingly attaching the ring to the FPC board; filling the ring with electrolyte 321; placing a second FPC board face-down on top of the first FPC board such that the capacitive element of the second FPC board is contained within the ring and facing the other capacitive element; and sealingly attaching the second FPC board to the ring. Ideally, the thickness of the ring should be substantially the same as the total thickness of the FPC structure. Nevertheless, due to the flexibility of the FPC boards 304, the ring thickness may deviate from the total thickness of the FPC structure and still allow formation of the chamber.

In another embodiment, the ring may comprise an aperture. In this embodiment, the electrolyte may be introduced to the chamber via the aperture and subsequently sealed to retain the electrolyte 321.

Figure 3C:
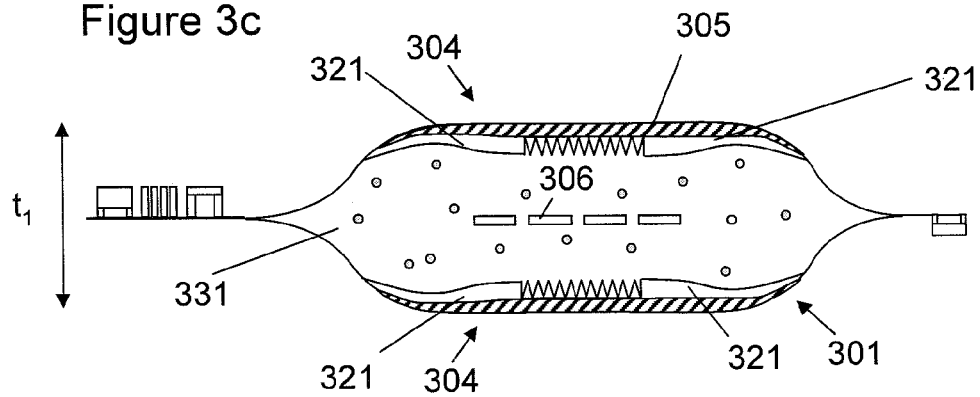
FIG. 3c illustrates an electrical storage apparatus comprising a solid or gel electrolyte and an electrode formulation described herein.

It should be noted, however, that the thickness, $t_1$, of the chamber is exaggerated in FIG. 3c. In practice, the capacitive electrodes 304 and separator 306 are in physical contact to minimise the thickness of the chamber. In another embodiment, the capacitive electrodes 304 may simply be spaced apart from one another. This configuration would remove the need for a separator 306, but may be difficult to maintain if the FPC structure is physically flexible. The structure of FIG. 3c could be formed form the same FPC board folded back on itself.

To charge the apparatus, a potential difference is applied across the electrodes 304. This is performed by connecting the positive and negative terminals of a battery (or other power supply) to the electrically conducting layers of the respective FPC boards 301. In practice, however, the electrically conducting layers of the FPC boards 301 would typically be connected to a charger circuit (not shown) which itself is connected to the battery or other power supply. Application of the potential difference polarises the electrolyte 331, causing adsorption of the positive and negative ions onto the exposed surfaces of the high surface area active element material 307 of the electrodes 304. The charge stored at the interface between the active element 307 and the electrolyte 331 can be used to power the electrical components when the supercapacitor discharges.

It will be appreciated that unlike the above described embodiment, which is configured such that the electrodes comprises a conducting layer which is both an electrically conductive transmission layer configured to enable transmission of current/charge to electronic components; and a conducting layer 305 configured to act, in use, as a charge collector to provide an electrical path for generated and/or stored charge through the conducting layer 305, other example embodiments (such as the embodiment shown in FIG. 3d) may be configured such that the conducting layer configured to act as a charge collector is distinct from the electrically conductive transmission layer configured to enable the transmission of charge/current to electronic components.

Figure 3D:
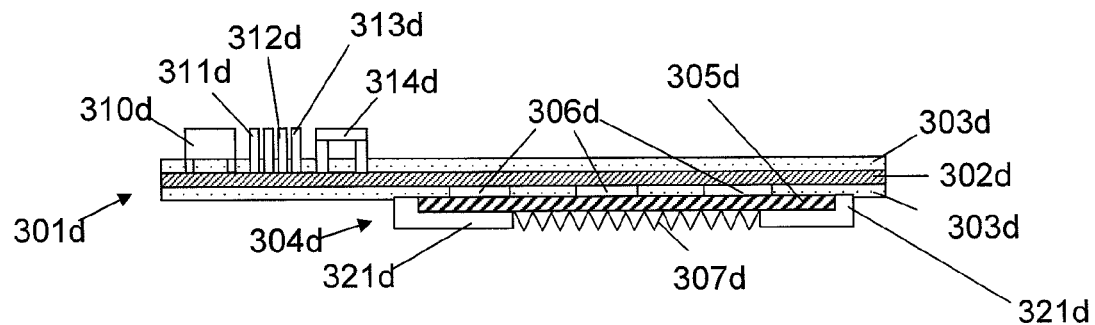

The embodiment shown in FIG. 3d is a FPC board 301d comprising an electrode which comprises a barrier layer 321d, the barrier layer 321d configured to cover a portion of a surface of a conducting layer 305d such that, when the electrode is in contact with an electrolyte, the electrolyte is prevented from substantially contacting and corroding the conducting layer at the covered portion; and an active electrode element 307d configured for use in generation and/or storing charge, the active electrode element 307d positioned in a non-covered portion in electrical contact with the conducting layer 305d to prevent the electrolyte from substantially contacting and corroding the conducting layer in the non-covered portion and to also be exposed to said electrolyte to allow for the generation and/or storage of charge and provide the generated/stored charge to the conducting layer. The electrically conducting layer 305d is electrically connected to the separate electrically conductive transmission layer 302d which is configured to enable current/charge to be transmitted to electronic components (310d-314d)/circuit, e.g. by vertical interconnect access (VIA) connections 306d.

Like the previous embodiment, the layer of electrically conductive material of the transmission layer 302d (which in this case is distinct from the conducting layer 305d configured to act as a charge collector) is configured to allow current/charge to pass to electronic components making up an electrical circuit (310d-314d).

It will be appreciated that the embodiment of FIG. 3d may be provided using a method similar to that described for the embodiment of FIG. 3a.

Figure 4A:
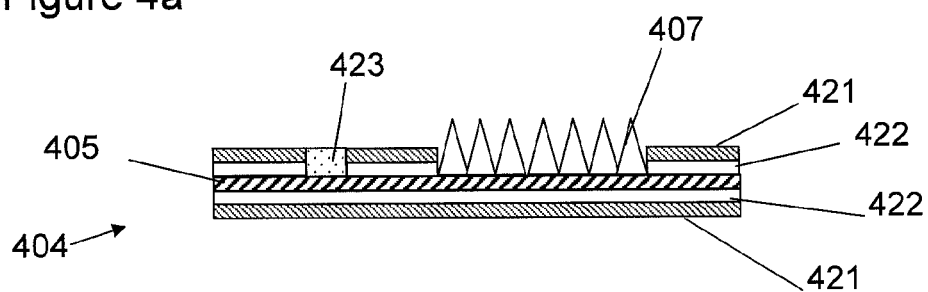
FIG. 4a illustrates an embodiment of an electrode.

FIG. 4a depicts a further embodiment comprising an electrode, the electrode comprising:

a conducting layer 405 configured to act, in use, as a charge collector to provide an electrical path for generated and/or stored charge through the conducting layer;

a barrier layer 421, the barrier layer configured to cover a portion of a surface of said conducting layer such that, when the electrode is in contact with an electrolyte, the electrolyte is prevented from substantially contacting and corroding the conducting layer at the covered portion; and an active electrode element 407 configured for use in generation and/or storing charge, the active electrode element 407 positioned in a non-covered portion in electrical contact with the conducting layer 405 to prevent the electrolyte from substantially contacting and corroding the conducting layer in the non-covered portion and to also be exposed to said electrolyte to allow for the generation and/or storage of charge and provide the generated/stored charge to the conducting layer.

In this case the barrier layer comprises polyethylene. It will be appreciated that for other example embodiments the barrier layer may comprise other materials, for example, other plastics such as polypropylene, polyester, polyurethane and polyimide. In this case, the barrier layer is an impermeable, electrically insulating layer.

In this case the conducting layer comprises copper (foil). It will be appreciated that other example embodiments, the conducting layer may comprise another metal, for example, aluminium.

The electrode 404 also comprises a high surface area active electrode element 407 on top of, and in direct electrical contact with, the electrically conducting layer 405, the material of the active electrode element 407 comprising a mixture of one or more of activated carbon (AC), multiple wall carbon nanotubes (MWNTs), carbon nanohorns (CNHs), carbon nanofibers (CNFs) and carbon nano-onions (CNOs). AC, MWNTs, CNHs, CNFs and CNOs are used because of their large electrical conductivity and high surface area. As mentioned earlier, the high surface area allows adsorption of large numbers of electrolyte ions onto the surface of the capacitive elements 404.

In this example embodiment, the polyethylene barrier layer 421 is bonded with acrylic-based adhesive 422 onto the copper foil 405 on the front and rear surfaces which are not coated by active electrode material, leaving only the activated electrode area (region around 407) and a contact 423 free from polyethylene. It will be appreciated that the adhesive can be any suitable glue, such as epoxy- or acrylic-based adhesives.

The high surface area active electrode element material 407 may be prepared by mixing different proportions of AC, MWNTs and CNHs together using polytetrafluoroethylene (PTFE) as a binder and acetone as a solvent, and homogenising the mixture by stirring. Following this, the resulting slurry is applied by rolling the mixture onto the surface of each electrically conducting layer 405.

Figure 4B:
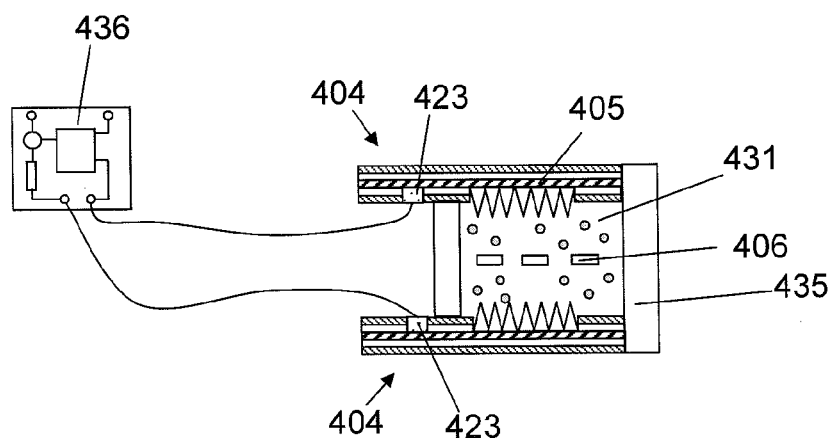
FIG. 4b illustrates an electrical storage apparatus comprising a solid or gel electrolyte and an electrode formulation described herein.

FIG. 4b depicts an apparatus comprising two electrodes as shown in FIG. 4a. It will be appreciated that other example embodiments may have only one electrode which is an embodiment of the present disclosure.

As shown in FIG. 4b, the electrodes 404 are configured such that the electrically conducting layers 405 (now coated in the high surface area material 407) are facing one another. Unlike the previous embodiment, in this embodiment the electrodes are held apart by a housing 435. In this case a separator is not used to keep the electrodes from being in direct electrical contact.

The electrically conducting layers 405 of other example embodiments may be formed from a variety of different materials, but advantageously are made from copper or aluminium. The choice of material affects the physical and electrical properties of the supercapacitor. Copper, and to a lesser extent aluminium, exhibit favourable electrical conductivity. This is advantageous because it allows charge carriers to flow through the electrically conducting layer 405 to the high surface area material 407 with minimum resistance. On the other hand, surface treatment such as a thin carbon layer on top of the foil offers better adhesion to the high surface area material 407 than copper and aluminium.

An electrolyte is required between the electrodes 404 to enable the storage of electrical charge. To achieve this, the electrodes as shown in FIG. 4a are configured to form a chamber within which the electrolyte 431 can be contained. The chamber is illustrated in cross-section in FIG. 4b.

It should be noted, however, that the thickness, $t_1$, of the chamber is exaggerated in FIG. 4a.

In this case the electrical contacts are in physical contact with the electrolyte. In this case each contact 423 is positioned in a non-covered portion of the conducting layer in electrical contact with the conducting layer 405 to prevent the electrolyte from substantially contacting and corroding the conducting layer in the non-covered portion and to also allow charge (or current) transfer to/from the conducting layer. The contact may be more chemically inert to the electrolyte than the conducting layer. For example, the contact may comprise gold or aluminium.

To charge the apparatus, a potential difference is applied across the electrodes 403. This is performed by connecting the positive and negative terminals of a battery (or other power supply) to the electrically conductive layers 405 of the electrodes 403 via the contacts 423. In practice, however, the electrically conductive layers 405 of the electrodes 403 would typically be connected to a charger circuit which itself is connected to the battery or other power supply. Application of the potential difference polarises the electrolyte 431, causing adsorption of the positive and negative ions onto the exposed surfaces of the high surface area material 407 of the negatively and positively charged electrodes 404, respectively. The charge stored at the interface between the high surface area material 407 and the electrolyte 431 can be used to power the components of a connected electrical circuit 436 when the supercapacitor discharges.

Advantages of the above described embodiments include that copper charge collectors (e.g. comprising copper foils) are useable in supercapacitor in conjunction with an otherwise corroding electrolyte (e.g. an organic electrolyte) because of the non-corroding/contaminating surface treatment. Using copper may allow the capacitor to achieve lower ESR and higher capacitance, which may be beneficial for applications needing high power density. In addition, no extra packaging bag needed, hence decrease the total thickness of the device.

Figure 5:
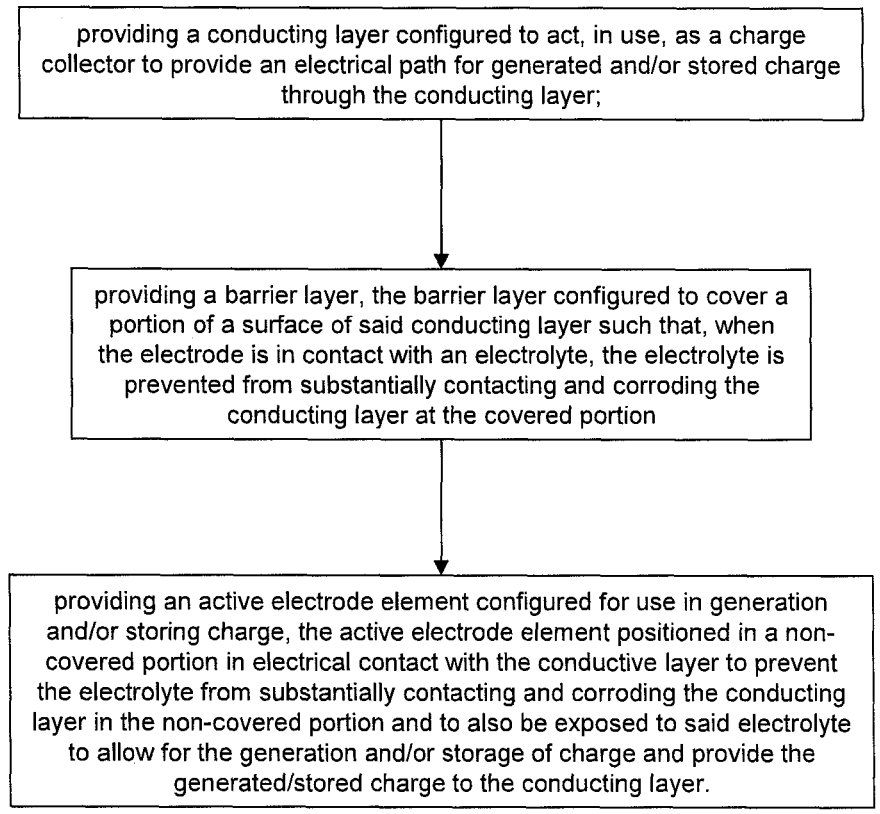
FIG. 5 is a flow chart of a procedure for providing an electrode.

FIG. 5 shows a flow diagram illustrating the provision of an electrode comprising a conducting layer, a barrier layer and an active electrode element, and is self-explanatory. It will be appreciated that the order of the stages illustrated may be changed. For example, the provision of the barrier layer may occur before, after or at the same time as the provision of the active electrode layer.

Figure 6:
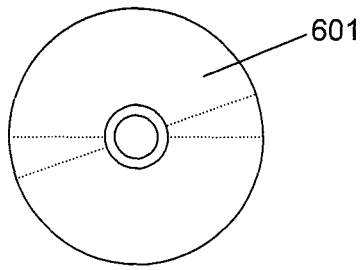
FIG. 6 illustrates schematically a computer readable medium providing a program.

FIG. 6 illustrates schematically a computer/processor readable medium 601 providing a computer program for controlling the making of an electrode and/or the making of an electrical storage apparatus as described herein, for example, in relation to FIG. 5. In this example, the computer/processor readable medium 601 is a disc such as a digital versatile disc (DVD) or a compact disc (CD). In other embodiments, the computer/processor readable medium 601 may be any medium that has been programmed in such a way as to carry out an inventive function. The computer/processor readable medium 601 may be a removable memory device such as a memory stick or memory card (SD, mini SD or micro SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar described embodiments.

Experimental Data

A number of preliminary experiments were carried out to determine the effectiveness of various materials as charge/current collectors in the construction of an electrode.

The active electrode element was prepared by mixing activated carbon and 5% binder in water to get a printable ink. The ink is bar-coated onto the current collectors and dried at 80° C. for 1 hour. Different current collectors such as aluminium foil, carbon surface finished aluminium, copper foil, and polyimide barrier layer covered copper foil are used as the charge/current collectors for comparison. The active electrode area of all devices was 2 cm². A separator soaked in electrolyte (1.25 M tetraethylammonium tetrafluoroborate (TEABF4) dissolved in propylene carbonate) was sandwiched in between the two electrodes. Organic electrolytes provide larger electrochemical windows than aqueous ones and can increase the cell operating voltage to 2.7V.

Figure 7A:
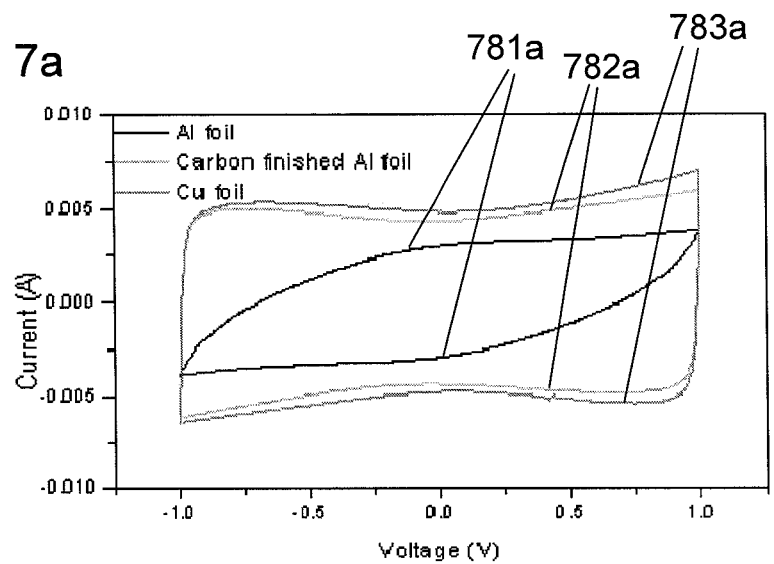
FIG. 7a-c shows experimental results.

FIG. 7a shows the cyclic voltammetry (CV) scans for the supercapacitors using different current collectors (aluminium 781a, carbon surface finished aluminium 782a, and copper foils 783a) from −1 to +1 V. The carbon finished aluminium 782a and copper current collector 783a devices show nearly rectangular shapes, indicating ideal double layer capacitor behaviour. The aluminium current collector 781a device shows a less rectangular shape. This suggests poor electrical contact between the aluminium and electrode. The capacitance and ESR value calculated from charge/discharge curves at 1 mA are listed in Table 1. The device using copper current collectors has the highest capacitance and lowest ESR.

TABLE 1 capacitance and ESR values for various current/charge collectors

| Current/charge collector | Capacitance (mF) | ESR (Ω) |
|---|---|---|
| Al Foil 781a | 44 | 14.8 |
| Carbon finished Al foil 782a | 84 | 1.42 |
| Cu foil 783a | 109 | 1.08 |

Figure 7B:
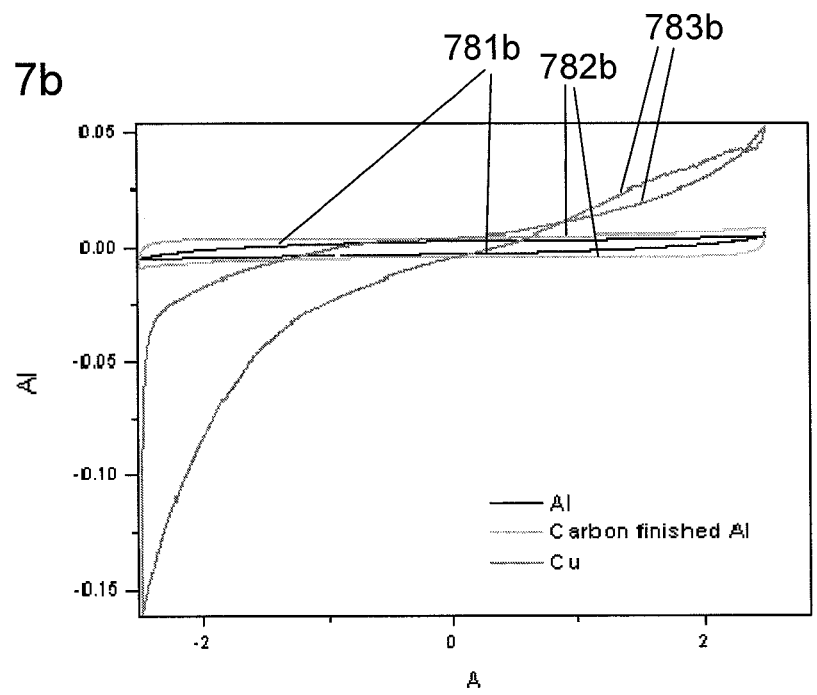

For the same devices, if all the conditions are kept the same, except the CV scan range is from −2.5 to 2.5V as shown in FIG. 7b. The aluminium 781b and carbon finished aluminium foil current collector 782b devices show the same behaviour as the scan from −1 to 1V. But the copper current/charge collector 783b device has obvious redox peaks, which comes from the electrochemical reaction between the exposed copper and the electrolyte.

Figure 7C:
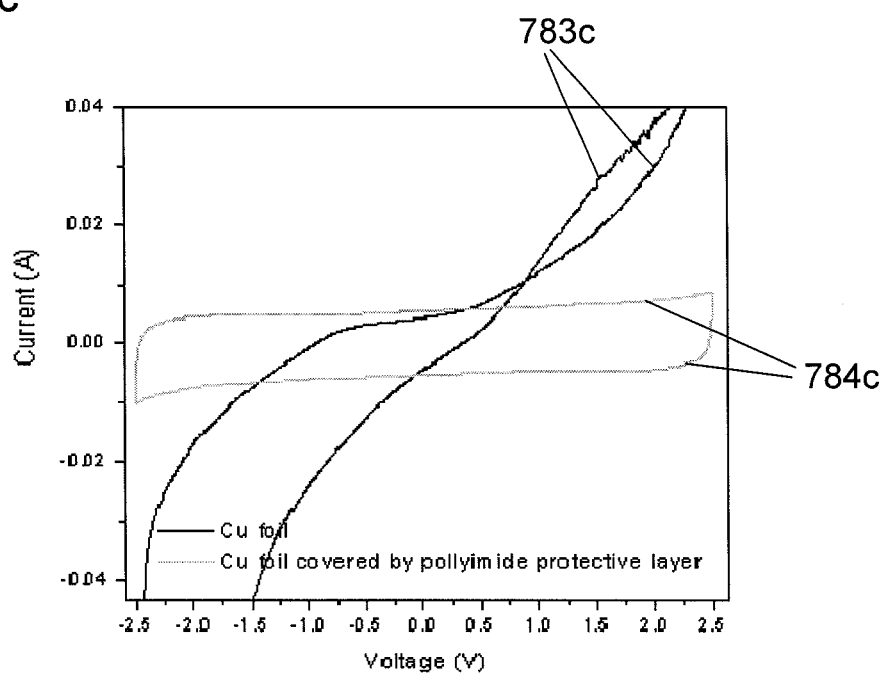

In contrast, if the electrolyte exposed copper area is covered by polyimide film as illustrated in FIG. 3a or 4b, the CV scan from −2.5V to 2.5V retains the good capacitor behaviour shown in FIG. 7a. No degradation in performance was observed in the device. This is illustrated in FIG. 7c which shows the difference of CV scans of the devices with 784c and without 783c a polyimide barrier layer on copper.

These results indicate that copper can be used as the current collector in supercapacitors even when using organic electrolytes if the electrolyte exposed copper area are covered by a protective layer. Such devices have better performance compared to the device using aluminium or coated aluminium foil. Without extra packaging bag needed, the device is also thinner and lighter compared with currently commercial available cells.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry may have other functions in addition to the mentioned functions, and that these functions may be performed by the same apparatus/circuitry. One or more disclosed aspects may encompass the electronic distribution of associated computer programs and computer programs (which may be source/transport encoded) recorded on an appropriate carrier (e.g. memory, signal).

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An electrode, comprising:
a conducting layer configured to act, in use, as a charge collector to provide an electrical path for generated and/or stored charge through the conducting layer;
a barrier layer, the barrier layer configured to cover a first portion of a surface of said conducting layer such that, when the electrode is in contact with an electrolyte, the electrolyte is prevented from substantially contacting and corroding the conducting layer at the covered portion; and
an active electrode element configured for use in generation and/or storing charge, the active electrode element configured to cover a second portion of the surface of the conducting layer adjacent to the first portion of the surface of the conducting layer, the second portion of the surface of the conducting layer defined by an interface of the conducting layer and the active electrode element not covered by the barrier layer, and the active electrode element positioned in electrical contact with the conducting layer to prevent the electrolyte from substantially contacting and corroding the conducting layer in the non-covered portion and to also be exposed to said electrolyte to allow for the generation and/or storage of charge and provide the generated/stored charge to the conducting layer;
wherein the electrolyte is prevented from substantially contacting and corroding the conducting layer only by the barrier layer or by the active electrode element.

2. The electrode of claim 1, wherein the barrier layer is an electrical insulator.

3. The electrode of claim 1, wherein the active material comprises one or more of the following: carbon nanoparticles, carbon nanotubes, carbon nanohorns, a carbon nanotube network, graphene, graphene platelets, metal nanowires, a metal nanowire mesh, semiconductor nanowires, a semiconductor nanowire mesh, and metal oxide nanoparticles.

4. The electrode of claim 1, wherein a portion of the conducting layer not covered by the barrier layer is configured to act as an electrical contact for connection to electrical components of a circuit.

5. The electrode of claim 1, wherein the conducting layer comprises copper.

6. The electrode of claim 1, wherein the barrier layer comprises one or more of plastic, polymer, polyimide, polyester, polyurethane and polyethylene.

7. The electrode of claim 1, wherein the barrier layer is bonded to the conducting layer using adhesive.

8. The electrode of claim 7, wherein the adhesive comprises an epoxy adhesive or an acrylic-based adhesive.

9. A circuit board comprising the electrode of claim 1, wherein one or more of the conduction layer and the barrier layer are formed from respective layers of the circuit board.

10. An apparatus, the apparatus comprising:
first and second electrodes, at least one of the electrodes being an electrode according to claim 1, wherein the apparatus is configured such that a chamber is defined between the first and second electrodes, the chamber comprising the electrolyte.

11. The apparatus of claim 10, wherein the first and second electrodes are sealed together to contain the electrolyte within the chamber.

12. The apparatus of claim 10, wherein one or more electrical components are physically and electrically connected to one or both of the first and second electrodes to allow for the supply of electrical energy to said one or more electrical components.

13. The apparatus of claim 10, wherein the electrolyte comprises one or more of propylene carbonate, tetraethylammonium tetrafluoroborate, and an aqueous solution of potassium chloride.

14. The apparatus of claim 10, wherein the apparatus comprises a separator between the first and second electrodes.

15. The apparatus of claim 10, wherein the apparatus is at least one of the following: a battery, a capacitor, and a battery-capacitor hybrid.

16. The apparatus of claim 10, wherein the apparatus is one or more of an electrical storage apparatus, circuitry for an electrical storage apparatus, and a module for the same.

* * * * *